(12) United States Patent
Weber et al.

(10) Patent No.: US 11,628,622 B2
(45) Date of Patent: Apr. 18, 2023

(54) EDGE PROFILOMETER

(71) Applicant: Inkbit, LLC, Medford, MA (US)

(72) Inventors: Aaron Weber, Arlington, MA (US);
Desai Chen, Arlington, MA (US);
Harrison Wang, New York, NY (US);
Gregory Ellson, Cambridge, MA (US);
Wojciech Matusik, Lexington, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 17/365,164

(22) Filed: Jul. 1, 2021

(65) Prior Publication Data

US 2022/0161494 A1     May 26, 2022

Related U.S. Application Data

(63) Continuation of application No. 16/936,776, filed on Jul. 23, 2020, now Pat. No. 11,072,120.

(51) Int. Cl.
| | |
|---|---|
| *B29C 64/277* | (2017.01) |
| *B29C 64/135* | (2017.01) |
| *B33Y 50/02* | (2015.01) |
| *B29C 64/209* | (2017.01) |

(52) U.S. Cl.
CPC .......... *B29C 64/277* (2017.08); *B29C 64/135* (2017.08); *B29C 64/209* (2017.08); *B33Y 50/02* (2014.12)

(58) Field of Classification Search
CPC ... B29C 64/277; B29C 64/135; B29C 64/209; B29C 64/112; B29C 64/393; B33Y 50/02; B33Y 10/00; G01B 11/2518; G01B 11/2522
See application file for complete search history.

(56) References Cited

U.S. PATENT DOCUMENTS

| | | | |
|---|---|---|---|
| 2010/0125356 A1 | 5/2010 | Shkolnik et al. | |
| 2017/0120527 A1 | 5/2017 | Miller et al. | |
| 2018/0029127 A1 | 2/2018 | Ng et al. | |
| 2018/0050391 A1* | 2/2018 | Maev ...................... | C23C 24/00 |
| 2018/0152158 A1 | 5/2018 | Ayraud et al. | |
| 2019/0258225 A1 | 8/2019 | Link et al. | |
| 2019/0375051 A1 | 12/2019 | Regaard et al. | |
| 2020/0143006 A1* | 5/2020 | Matusik ................ | B29C 64/393 |
| 2020/0206487 A1 | 7/2020 | Edgar | |
| 2020/0238625 A1 | 7/2020 | Champion et al. | |

(Continued)

FOREIGN PATENT DOCUMENTS

| | | |
|---|---|---|
| CN | 111295259 A | 6/2020 |
| EP | 3587999 A1 | 1/2020 |

*Primary Examiner* — Nahida Sultana

(74) *Attorney, Agent, or Firm* — Occhiuti & Rohlicek LLP

(57) ABSTRACT

A profilometer provides, to a controller, a feedback signal indicative of topography of an exposed surface of an object that is being manufactured by a 3d printer. The profilometer includes an emitter and a camera. The emitter illuminates a region of surface of the object with a pattern having an edge that defines a boundary of an illuminated portion of the surface. The camera receives an image that transitions between a first state in which the edge is visible in the image at a location that is indicative of the surface's depth and a second state in which the edge is not visible at all. From this second state, the controller obtains information representative of a depth of the surface.

23 Claims, 11 Drawing Sheets

(56) References Cited

U.S. PATENT DOCUMENTS

| | | | |
|---|---|---|---|
| 2022/0196386 A1* | 6/2022 | Heidemann | G01B 11/2513 |
| 2022/0296922 A1* | 9/2022 | Cole | A61K 51/08 |
| 2022/0297233 A1* | 9/2022 | Yap | B33Y 30/00 |
| 2022/0301143 A1* | 9/2022 | Chaudhary | B33Y 50/02 |

* cited by examiner

EDGE PROFILOMETER

CROSS-REFERENCES TO RELATED APPLICATIONS

This application claims the benefit of U.S. application Ser. No. 16/936,776 filed Jul. 23, 2020, the contents of which are incorporated herein by reference.

BACKGROUND OF THE INVENTION

Additive manufacturing refers to fabricating an object by selective addition of material. A typical additive manufacturing process works by slicing a digital model of an object into layers. A fabrication apparatus receives data representing the layers and causes the layers to be deposited, starting with a bottom layer and ending with a top layer. Additive manufacturing is rapidly gaining popularity in a variety of markets including automotive, aerospace, medical devices, pharmaceuticals, and industrial tooling.

One known method for additive manufacturing includes having a printhead mounted on a gantry. The printhead deposits droplets of liquid printable resins at different locations within a "build volume" to fabricate an object that is supported by a "build platform." In some cases, the printhead moves relative to the build platform. In other cases, the build platform moves relative to the printhead. An apparatus of this type is sometimes called a "3D printer."

Because of various random errors that can occur during such a process, it is useful to be able to inspect the object as it is being manufactured. A vigilant and on-going inspection of this type allows errors to be fixed in real time, thus reducing the possibility of irretrievable defects that would require discarding the object.

Of particular importance is the ongoing inspection of the object's exposed surface, and in particular, its topography. A suitable instrument for determining the topography of such a surface is a profilometer that carries out optical triangulation.

A typical profilometer raster-scans a laser across an object's surface. Based on the reflection of light from the laser and the known geometry, a processor uses data derived from this reflection to calculate the location from which the reflection occurred.

SUMMARY OF THE INVENTION

An apparatus for carrying out additive manufacturing for manufacturing an object includes a printhead having a nozzle that ejects resin towards the object, an actuator, a controller that controls operation of the printhead and the actuator, and a profilometer that provides, to the controller, a feedback signal indicative of topography of an exposed surface of the object. The profilometer includes an emitter and a camera.

The emitter illuminates a region of the object's surface with a pattern. This pattern has an edge that defines a boundary between an illuminated portion of the surface and a non-illuminated portion of the surface.

The camera receives an image of some region of the surface. As the actuator causes relative motion, the image transitions between first and second states. In the first state, the edge is visible in the image. The edge's location within the image indicates a depth of the surface at that region. In the second state, the edge is not visible in the image.

At some times during operation of the apparatus, the controller receives the image in the second state, i.e., in the state in which the edge is invisible. Even though the edge is not visible, the controller nevertheless obtains, from that image, information representative of a depth of the surface.

In some embodiments, the information that the controller obtains from the image is that the depth of the surface is too high for the edge to be seen in the image. In other embodiments, the information is that the depth of the surface is too low for the edge to be seen in the image.

In some embodiments, the second state is one in which the pattern completely fills the image. In others, the second state is one in which the image is completely devoid of any portion of the pattern.

Among the embodiments are those in which the emitter comprises and an LED pattern-projector, those in which it generates an in-focus image of an optical slit on the object, and those in which it generates an in-focus image of an optical slit on the object.

The emitter can be in a variety of locations. In some embodiments, the emitter is disposed to illuminate the object's surface from above the object. In others, it is disposed to illuminate the object's surface from an oblique angle. In still others, it is disposed such that a depth of the surface that corresponds to a location of the edge in the first state depends on the location of the region on the surface. And in still other embodiments, the emitter is disposed such that a depth of the surface that corresponds to a location of the edge in the first state is independent of the location of the region on the surface.

The camera too can be in a variety of locations. In some embodiments, it is disposed to point at the region along a vertical direction, the vertical direction being defined by a vertical line that passes through the surface. In others, it is disposed to point at the region from a direction that makes an angle relative to a vertical line that passes through the surface.

Some embodiments feature a pair of cameras that point towards the region from different directions. Both cameras can therefore acquire an image of the region. This is particularly useful in case an obstacle blocks the view of one of the cameras. To simplify implementation, it is useful if the cameras point along directions that make the same angle relative to a vertical axis. In such embodiments, there is typically one emitter overhead that projects onto the surface from above.

In some of the foregoing embodiments, one of the cameras is further from the region than the other camera. Among these are embodiments in which the controller receives the image only from the further of the two cameras. Also among these are embodiments in which the controller receives the image only from the closer of the two cameras.

Some embodiments feature dual emitters that illuminate the surface from different directions. This too is useful in case an obstacle blocks one of the emitters. To simplify implementation, it is useful if the emitters point along directions that make the same angle relative to a vertical axis. In such embodiments, there is typically one camera overhead that acquires the image from the surface.

Among the embodiments are those that include circuitry for learning a transformation based on received data. In such embodiments, the controller receives an image in the first state and applies a transformation to that image to generate data representative of said depth. This transformation is one that was learned by the circuitry. Also among the embodiments are those in which the circuitry includes an implementation of a supervised learning algorithm for solving a regression problem and those in which it includes an implementation of a neural network. In other embodiments, the controller also receives an image in said first state and convolves an edge profile obtained therefrom with each curve in a plurality of pre-computed unit curves, each of which corresponds to a different edge profile.

In still other embodiments, the controller is configured to also receive an image in the first state and to derive, therefrom, an edge profile. The controller then discards at least a portion of said edge profile or at least ignores it when estimating the location of the edge.

In sill other embodiments, the camera receives images from two regions. The controller applies different transformations to each image to generate depths at those different regions. This is particularly useful when the different regions are made of different materials with different optical properties or when one region is such that light propagating into that region is prone to interacting with structures with which it does not interact when propagating through the other region. This may be useful in cases where one region is thin enough so that light passing therethrough interacts with the base platform.

In another aspect, the invention features a profilometer that provides, to a controller, a feedback signal indicative of topography of an exposed surface of an object that is being manufactured by a 3D-printer. The profilometer includes an emitter and a camera. The emitter illuminates a region of surface of the object with a pattern having an edge that defines a boundary of an illuminated portion of the surface. The camera receives an image that transitions between a first state in which the edge is visible in the image at a location that is indicative of the surface's depth and a second state in which the edge is not visible at all. From this second state, the controller obtains information representative of a depth of the surface.

In another aspect, the invention includes circuitry configured for learning a transformation based on received data and to provide the transformation to a controller that controls a profilometer and that is configured to receive an image in a first state and to apply the transformation to data representative of the image in the first state to generate data representative of a depth, the transformation having been learned by the circuitry. The first state is a state in which an edge is visible in the image at a location that is indicative of the depth. This is contrasted with a second state, in which the edge is not visible in the image. The controller is configured to obtain information representative of the depth from the image in the second state.

Among the foregoing embodiments are those in which the circuitry comprises a neural network and those in which it is configured to solve a regression problem.

DETAILED DESCRIPTION

Figure 1:
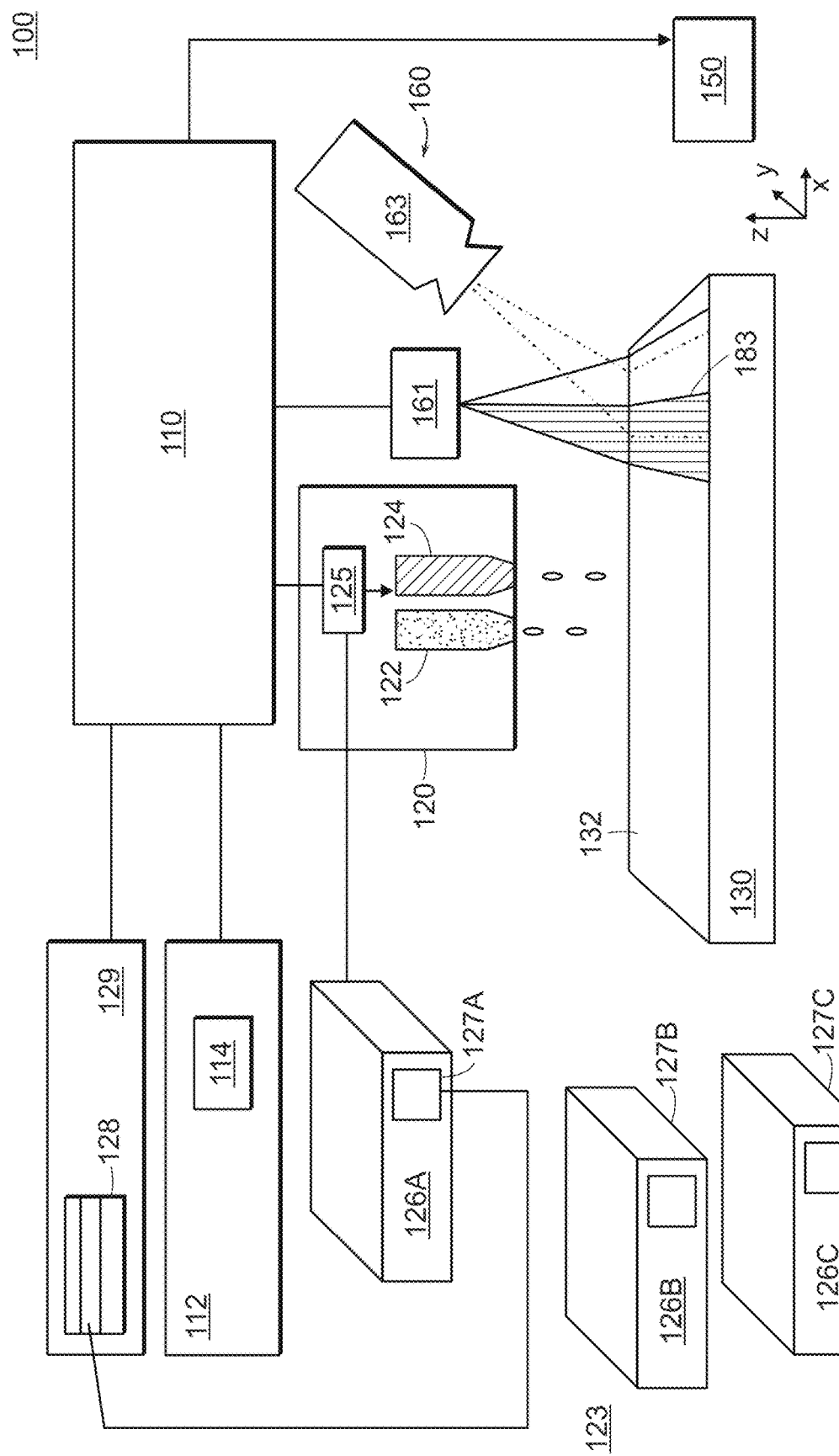
FIG. 1 shows an additive-manufacturing apparatus having an edge profilometer that includes a camera and an emitter.

FIG. 1 shows an additive-manufacturing apparatus 100 having a print head 120 to be used during additive manufacturing of an object 130 that rests on a build platform (not shown). In a typical apparatus, the print head 120 includes plural nozzles 122, 124 for jetting different resins. Examples of such an additive-manufacturing apparatus can be found in U.S. Pat. No. 10,252,466 and in U.S. Patent Publ. 2018/0169953, the contents of which are incorporated herein by reference.

During the course of an object's manufacture, an actuator 150 causes motion of the object 130 relative to the print head 120. In the illustrated embodiment, the actuator 150 translates the object 130 in a vertical direction z and in two horizontal directions x, y. The two horizontal directions define a "transverse plane."

To promote more accurate manufacture, a controller 110 relies on feedback to control both the operation of the print head 120 and the movement imparted by the actuator 150. Such a controller 110 relies at least in part on information on the topography of the object's surface 132. This information is derived from an edge profilometer 160 that includes an emitter 161 and a camera.

In some embodiments, the additive-manufacturing apparatus 100 includes a machine-learning system 112 that, in some implementations, includes a neural network 114. The operation of these components is described in detail below.

In other embodiments, the additive-manufacturing apparatus 100 includes a mixer 125 that draws resins from in installed resin module 126A. The installed resin module 126A is taken from a kit 123 that includes plural resin modules 126A-126C.

Affixed on each of the resin modules 126A-126C in the kit 123 is a corresponding pointer 127A-127C that identifies the particular resin contained in that resin module 126A-126C. Characteristics of each resin are contained in resin data 128 stored in a materials database 129. This materials database 129, along with the resin data 128, comes as part of the kit 123.

A suitable pointer 127A-127C is one encoded in a bar code or a QR code. The controller 110 thus reads the pointer 127A of the installed resin module 126A and identifies the particular resin that is contained within it. As a result, the controller 110 accesses the relevant resin data 128 in connection with operating the printhead 120 and in connection with calibrating the printhead 120 to accommodate inks having different properties. In a typical embodiment, the emitter 161 is an LED pattern-projector that generates an in-focus image of an optical slit or mask on the object 130. As a result, the emitter 161 illuminates the object's surface 132 with a pattern having an edge 183. This provides a sharp transition between illuminated and non-illuminated portions of the object's surface 132.

Figure 2:
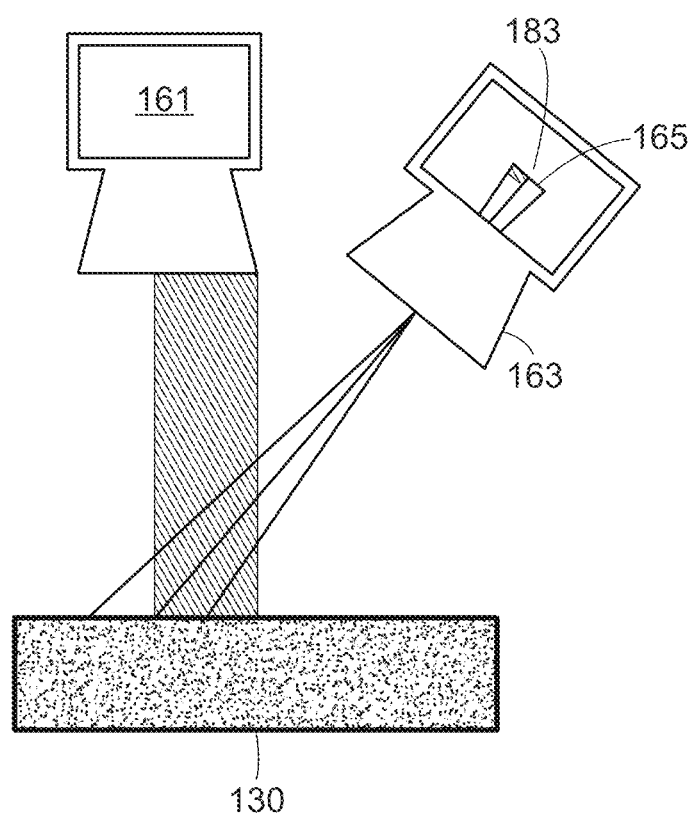
FIG. 2 shows the camera in FIG. 1 detecting an edge.

The camera 163 records the location of the edge 183. In a typical embodiment, the camera 163 is an area-scan camera. Such a camera 163 has an array of sensors that defines an array 165, which is shown in FIG. 2.

In FIG. 1, the emitter 161 is an overhead emitter that illuminates the object 130 from the vertical direction while the camera 163 views the object 130 from an angle. However, in some embodiments, these are swapped so that the camera 163 is an overhead camera that views the edge 183 from a vertical direction and the emitter 161 illuminates the object from an angle. The main distinction is that when the emitter 161 is overhead, measurement of depth does not depend on the location of the region being inspected in the transverse plane. However, if the emitter 161 is not overhead, then this is no longer the case.

More generally, the illustrated edge profilometer 160 features a first component at a first elevation angle and a second component at a second elevation that is less than the first elevation angle. The elevation angle is defined such that a point directly overhead as seen from the object, i.e., a point at the zenith, has an elevation angle of 90° and a point that would correspond to the horizon has an elevation angle of 0° degrees or 180°. In a preferred embodiment, the first elevation angle is ninety degrees and the second is either in a first interval or a second interval. The first interval is (90°, 180°) and the second interval is (0°, 90°). The use of parentheses indicates an open interval that does not include its endpoints. In such embodiments, the first component is referred to as an "overhead" component and the second component is referred to as an "off-axis" component.

If the first component is an emitter 161, then the second component is a camera 163. If the first component is a camera 163, then the second component is an emitter 161.

As shown in FIG. 2, the camera 163 includes an array 165 of photosensitive elements, each of which defines a pixel. Each pixel $P_{m,n}$ is identified by a row index m and a column index n. The row index m identifies a particular row to which the pixel belongs. The column index n identifies a particular column to which the index belongs. For a particular row index m', the pixels $P_{m',n}$ $\forall n$ define the "associated column" of row m'. Similarly, for a particular column index n', the pixels $P_{m,n'}$ $\forall m$ define the "associated row" of column n'.

An image of the pattern forms on this array 165 with the pattern's edge 183 falling at a particular location along the array 165. For a known geometry, the location of the edge 183 along this array 165 provides a basis for estimating the z-coordinate of the object's surface 132 in the particular region of the object 130 that is being inspected. The value of this z-coordinate will be referred to herein as "depth." This value could, of course, also have been referred to as a "height," the distinction between the two being a result of an arbitrary choice of a datum. Thus, although the term "depth" is used herein for consistency, the value of the z-coordinate is ultimately a distance to a reference datum.

In general, the depth of the object's surface 132 changes over time. This can result from activity by the print head 120, which deposits resin onto the object 130 and thus reduces the depth, or from movement by the actuator 150. In either case, the edge's location moves along the sensing array 165. This movement provides a feedback signal that the controller 110 relies upon for controlling either or both the actuator 150 and the print head 120.

To improve scanning rate, it is useful for the array 165 to be relatively small. After all, the process of optical triangulation upon which the controller 110 relies requires many data samples to be processed in real-time. Thus, an excessively large array 165 imposes a greater computational burden. On the other hand, as the array 165 becomes smaller, it becomes increasingly likely that the edge 183 will no longer fall within the array 165.

In some embodiments, the camera 163 has an array 165 with a selectable length. This length depends in part on the desired region-of-interest. Since the array 165 is formed by a set of adjacent rows of pixels, this can be implemented by enabling only a subset of the rows. Such an embodiment provides the opportunity to trade scanning speed for depth-measurement range. To measure a greater range of depth, the array 165 can be made longer by re-enabling selected pixels. However, since frame rate depends on how many rows are being used in the array 165, a longer array 165 will cause a smaller frame rate.

Figure 3:
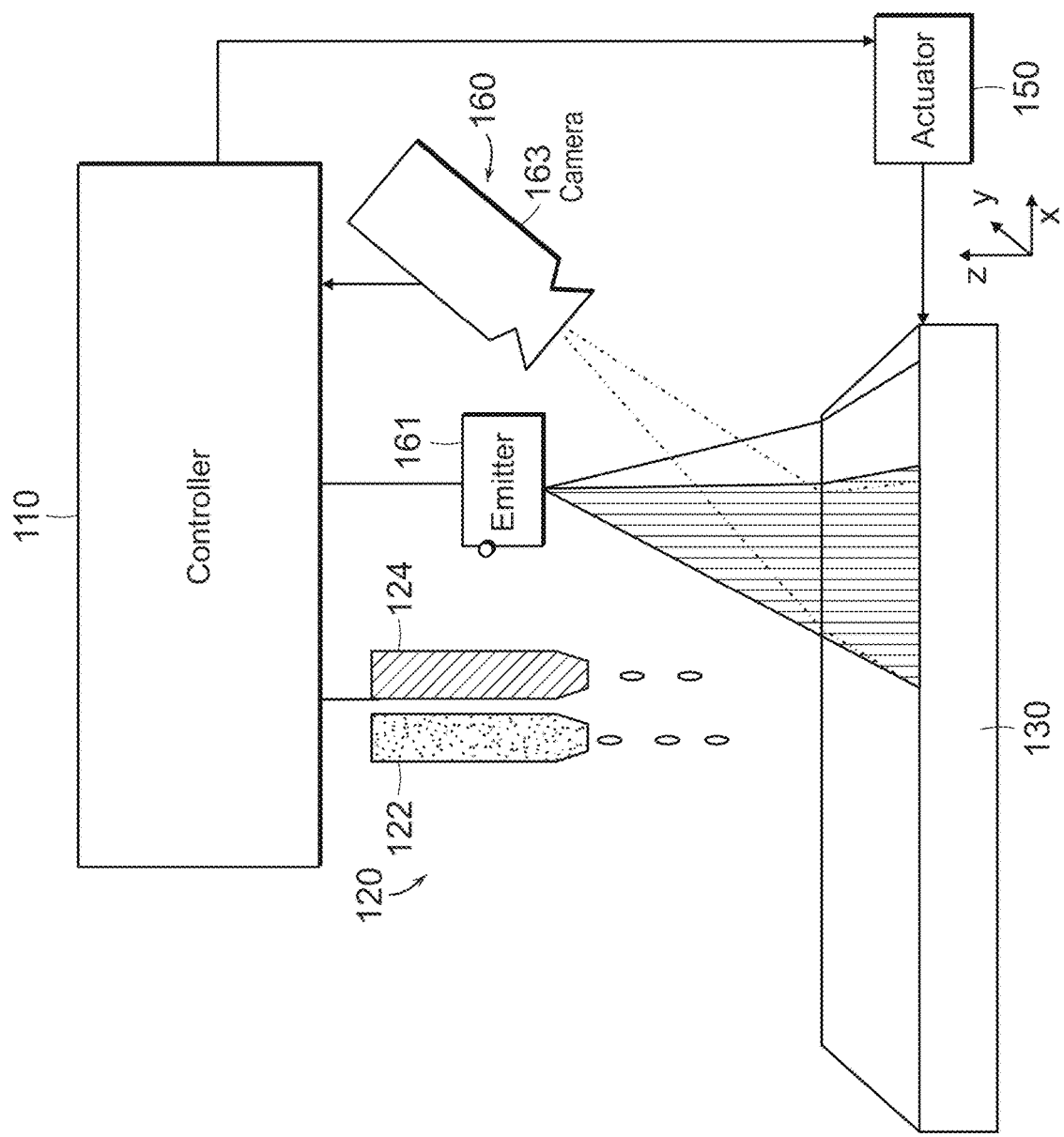
FIG. 3 shows the apparatus of FIG. 1 with the object being manufactured having been moved in a first direction.
Figure 4:
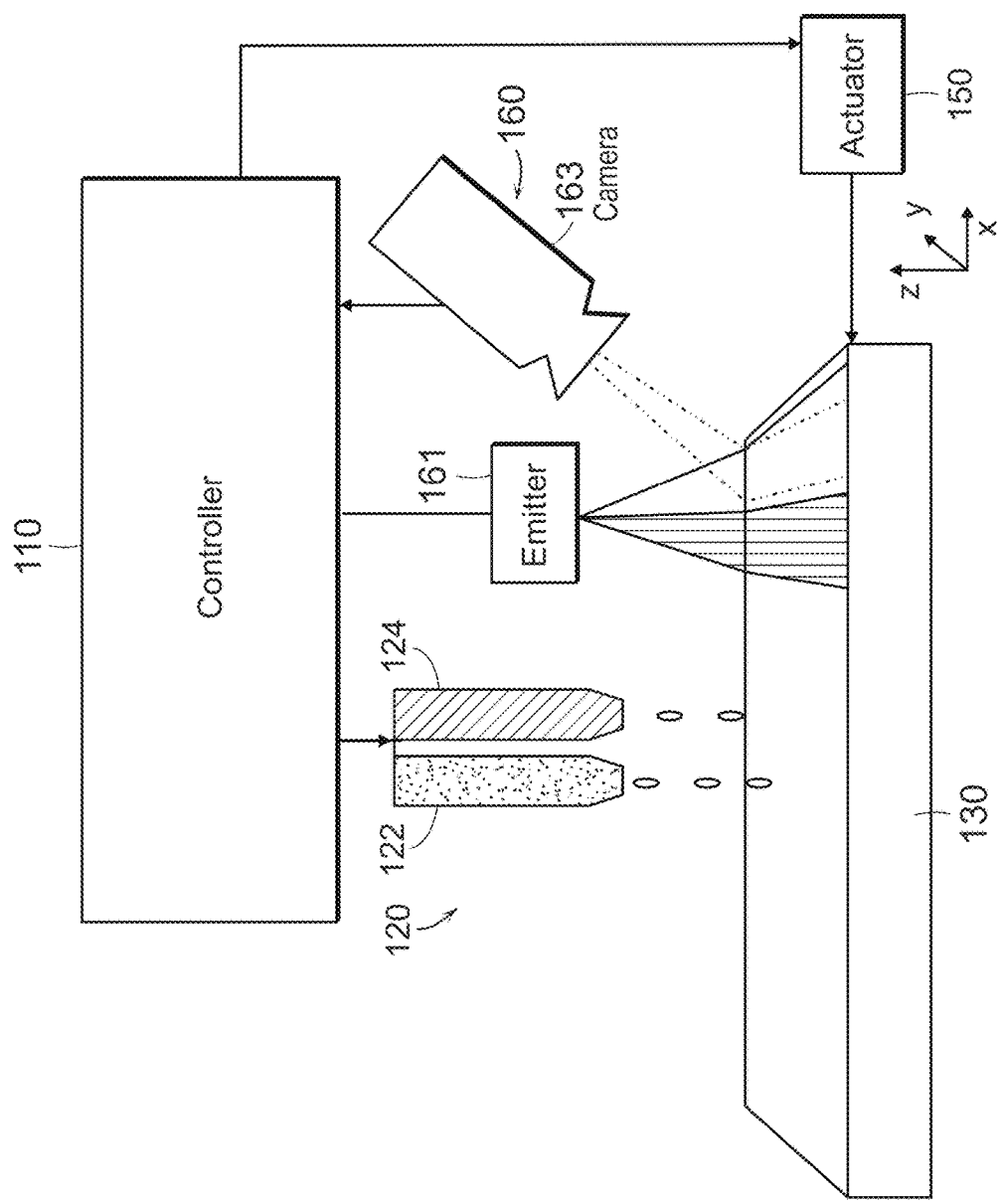
FIG. 4 shows the apparatus of FIG. 1 with the object being manufactured having been moved in a second direction, which is opposite to the first direction shown in FIG. 3.

For example, in the situation shown in FIG. 3, the pattern spans the camera's entire field-of-view. As a result, the pattern spans the entire array 165. This means that the edge 183 cannot be seen. Therefore, the depth cannot be determined. Conversely, in the situation shown in FIG. 4, the pattern misses the camera's entire field-of-view. As a result, the pattern misses the entire array 165. This means that the edge 183 cannot be seen and therefore the depth cannot be determined. The length of the array 165 determines the range over which depth can be detected.

Figure 5:
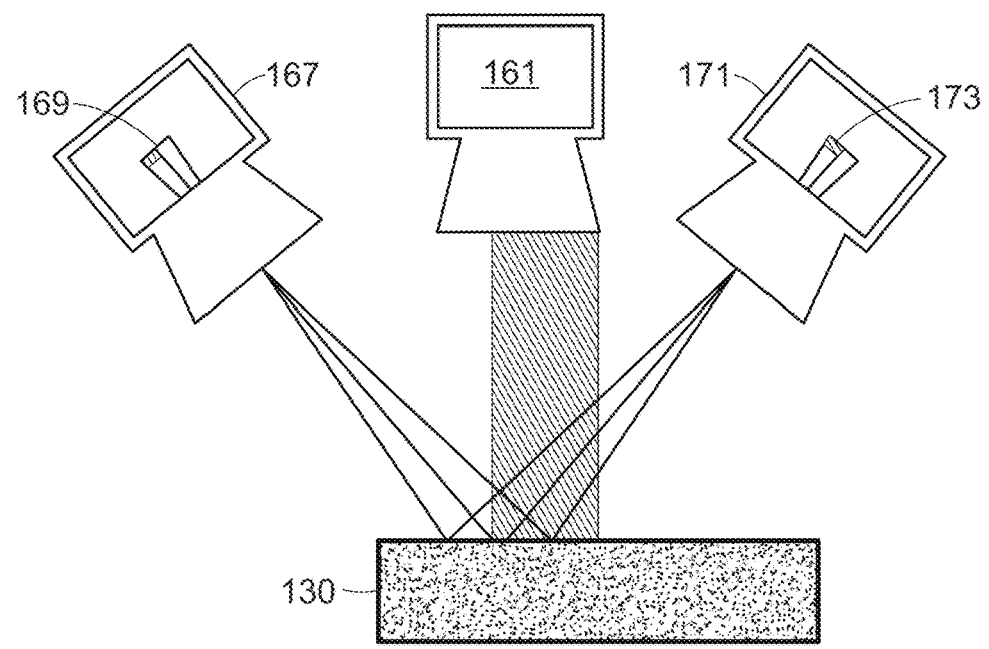
FIG. 5 shows an edge profilometer with two cameras.
Figure 6:
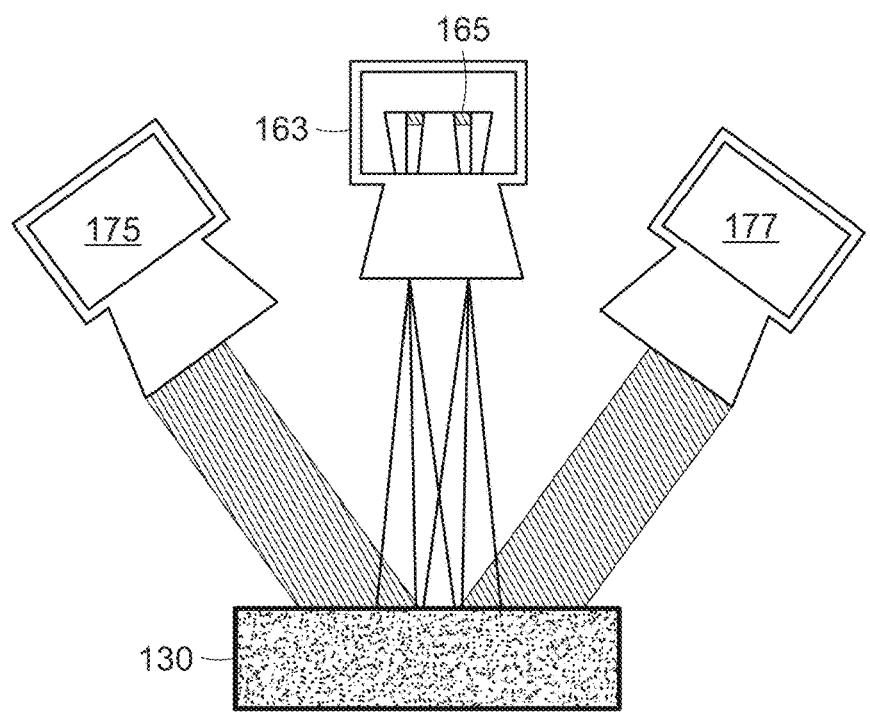
FIG. 6 shows an edge profilometer having two emitters.

A useful feature of the edge profilometer 160 is that even when the edge 183 falls outside the array 165, it is still possible to distinguish between an array 165 that is fully illuminated from one that is not illuminated at all. This distinction provides the controller 110 with information concerning which side of the array 165 the edge 183 has surpassed. In particular, this information tells the controller 110 whether the area being inspected by the camera 163 is too high or too low to see the edge 183 and hence, how to move the object 130 to bring the edge 183 back into view. In some cases, this information tells the controller 110 whether or not to deposit more resin. The edge profilometers 160 illustrated thus far each have an overhead component and an off-axis component. Alternative embodiments feature redundancy in the off-axis component. For example, FIG. 5 shows an embodiment having an overhead emitter 161 and a pair of off-axis cameras 167, 171 with corresponding first and second arrays 169, 173. FIG. 6 shows an embodiment with an overhead camera 163 and a pair of off-axis emitters 175, 177.

The embodiments shown in FIGS. 5 and 6 are particularly useful for avoiding difficulties caused by shadowing. In general, there are two kinds of shadowing that occur: obstruction of a camera's view and interception of an emitter's beam.

Figure 7:
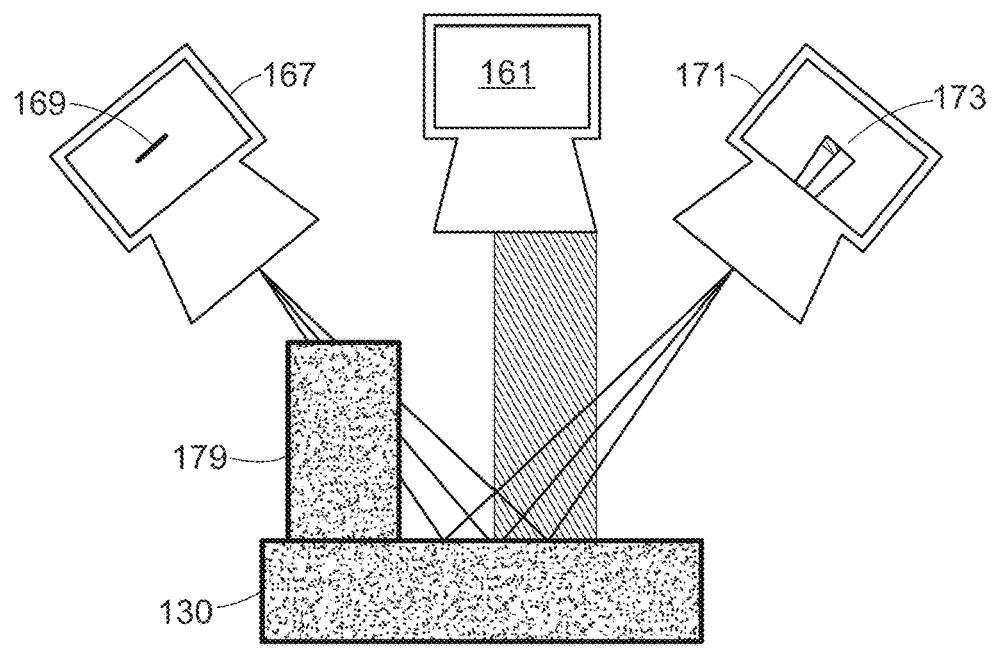
FIG. 7 shows the edge profilometer of FIG. 5 circumventing an obstacle.

FIG. 7 shows an example of an obstacle 179 that obstructs a camera's view of the object 130. The redundancy in cameras 167, 171 in FIG. 5 provides a way for the controller 110 to circumvent the difficulty caused by the obstacle 179 in FIG. 7.

Figure 8:
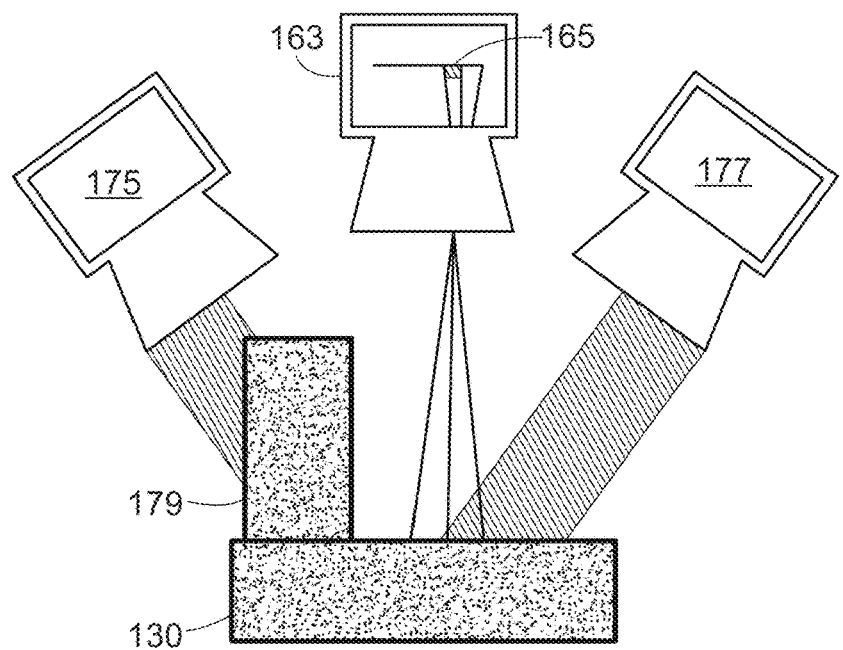
FIG. 8 shows the edge profilometer of FIG. 6 circumventing an obstacle.

FIG. 8 shows an example in which an obstacle 179 intercepts an emitter's beam, thus making it impossible to illuminate the object 130. The redundancy of the emitters 175, 177 shown in FIG. 6 allows the controller 110 to circumvent the difficulty caused by the obstacle's interception of the emitter's beam, as shown in FIG. 8.

Figure 9:
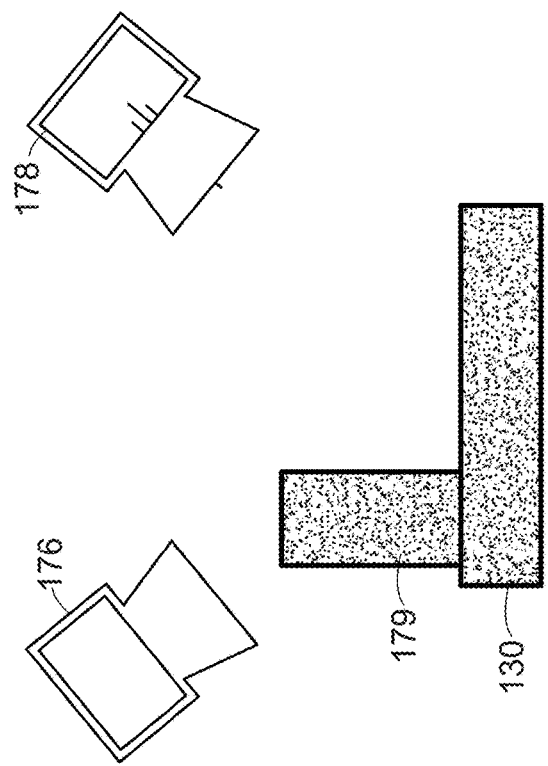
FIG. 9 shows an edge profilometer having two hybrid components, each of which incorporates both a camera and an emitter.

In another embodiment, shown in FIG. 9, the profilometer 160 includes a pair of hybrid components 176, 178 each of which includes components to enable it to function as both a camera and as an emitter. This embodiment is useful when there is insufficient space to have three separate components.

The camera's field of view covers a particular range of rows and columns. At each row and column, there exists a pixel intensity. These pixel intensities collectively define a profile. A column profile shows pixel intensities along a particular row's associated column. A row profile shows pixel intensities along a particular column's associated row.

Figure 10:
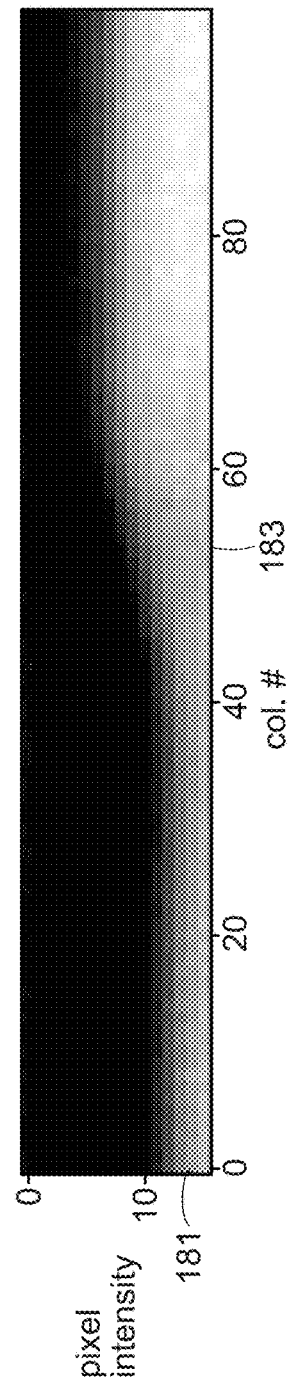
FIG. 10 shows data obtained from the sensing array of the camera shown in FIG. 2.

FIG. 10 shows a column profile 181 for a particular row's associated column. The column profile 181 shows pixel intensity at each pixel in that row's associated column. As is apparent, the edge 183 is not as distinct as one might have hoped.

Figure 11:
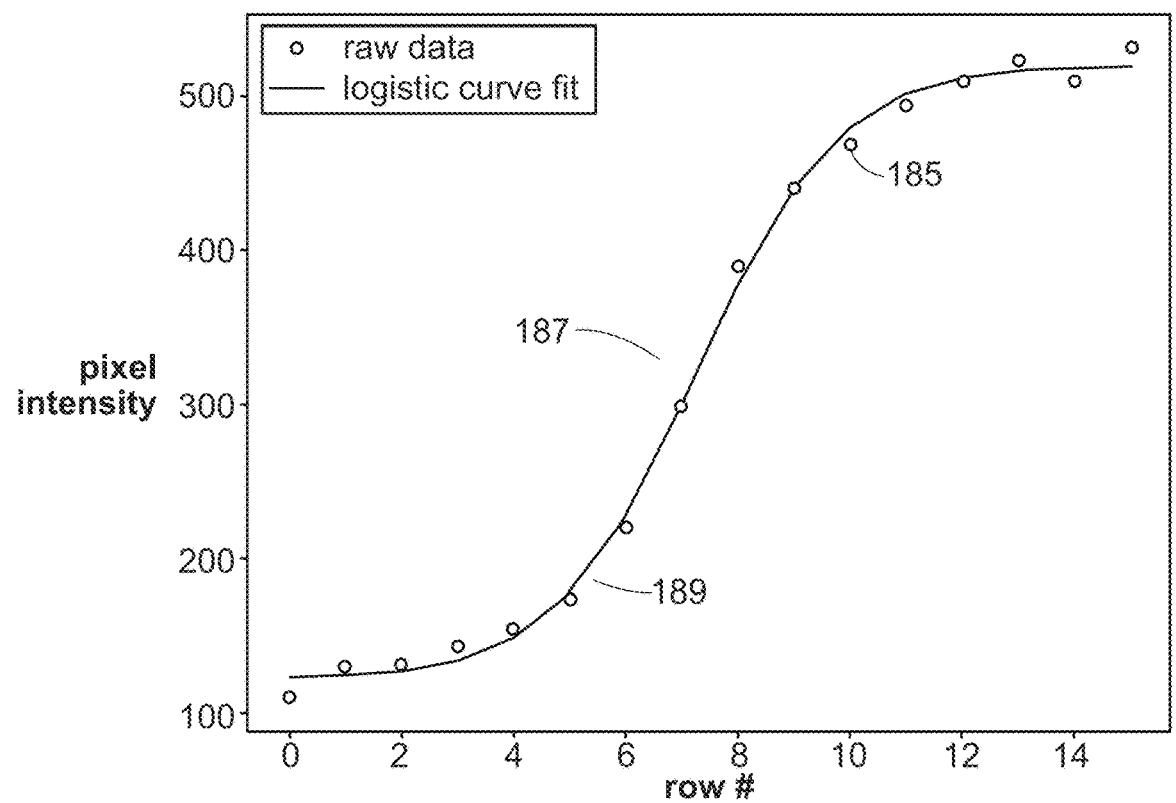
FIG. 11 shows a curve that has been fit to the data shown in FIG. 12.

FIG. 11 shows measurements of a row profile 185 showing pixel intensity at each pixel along a particular column's associated row. Ideally, the row profile 185 should reveal a distinct step 187. The row at which this step 187 occurs would then provide a precise depth estimate.

Figure 12:
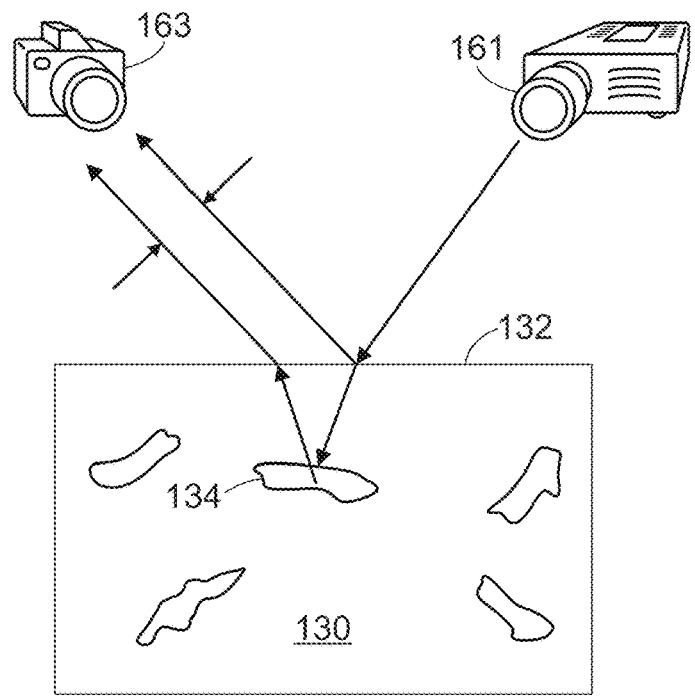
FIG. 12 illustrates the effect of scattering centers beneath the surface of the object in FIG. 1.

However, in many cases, the material from which the object 130 is made is slightly translucent, as shown in FIG. 12. In such a material, there are often subsurface scattering centers 134. The resulting subsurface scattering blurs what should have been a distinct step 187.

For each column shown in the column profile 181, it is useful to estimate the step's location in that column's associated row. This is carried out by a regression that fits the measurements of the row profile 185 to a logistic curve 189 from a family of logistic curves. In the illustrated embodiment, the family of logistic curves is given by $$f(x) = A + \frac{B}{1 + e^{-k(x-x_0)}}$$

where A and B define the extrema of the logistic curve 189, k is the slope, and $x_0$ is the midpoint. The row that is closest to being at the midpoint of the logistic curve 189 can be used as a surrogate for the depth of the object's surface at the lateral location being measured. In addition to the row profile 185, FIG. 11 shows the particular logistic curve 189 from the family of curves that best fits the row profile 185 along a particular column's associated row. Different logistic curves 189 are likely for other columns.

Figure 13:
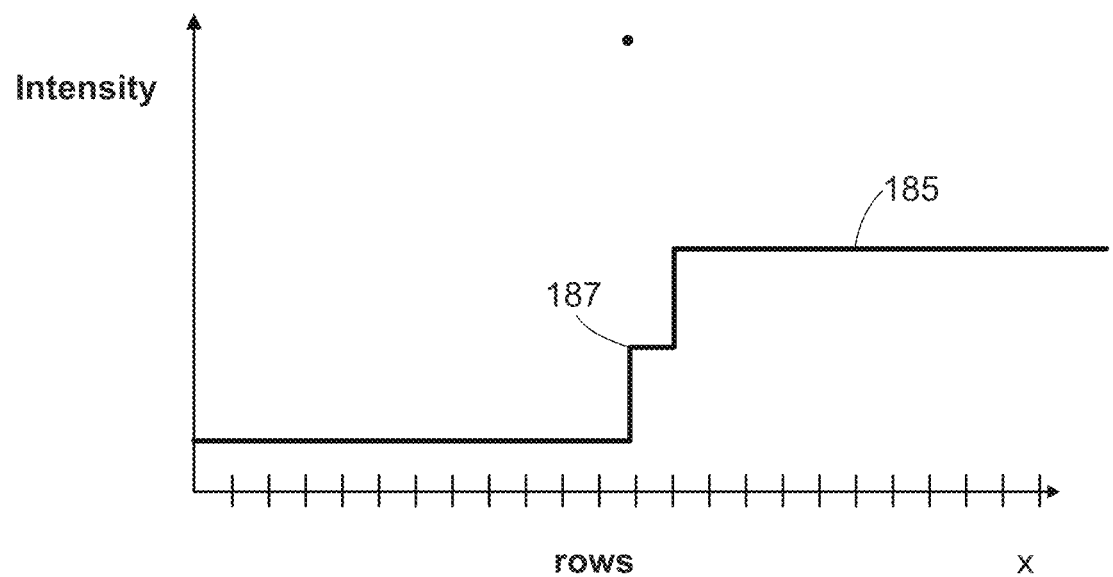
FIG. 13 shows an idealized image of what the camera detects.
Figure 14:
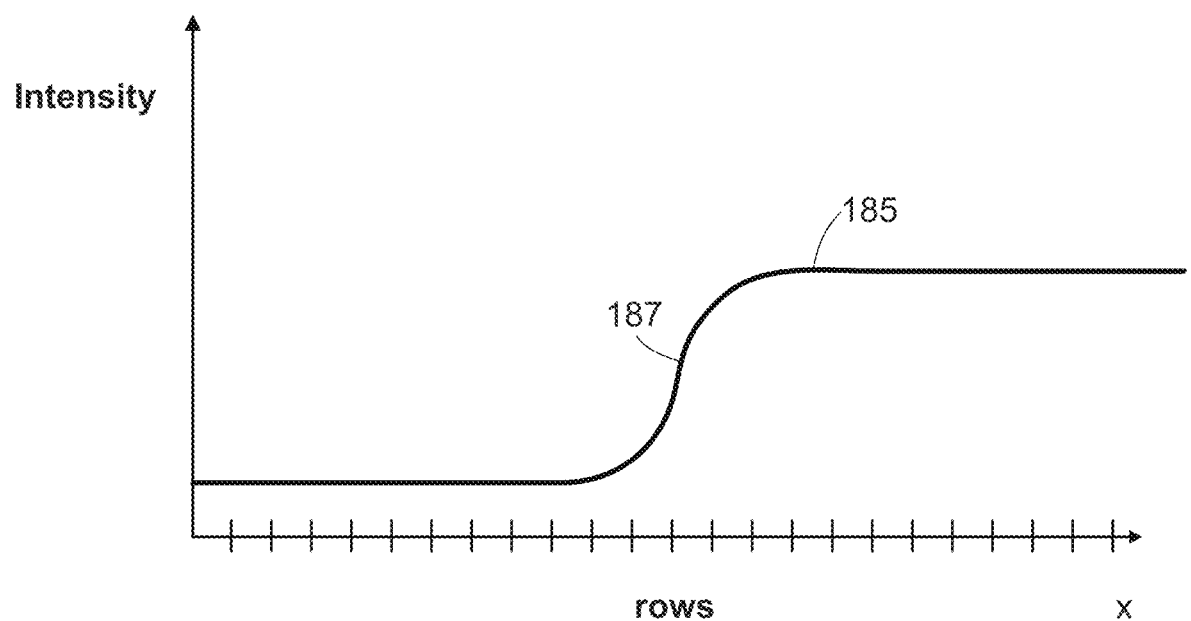
FIG. 14 shows the image of FIG. 15 after having been blurred as a result of subsurface scatter.

In the absence of subsurface scatter and other noise sources, including noise resulting from having a camera 163 and/or an emitter 161 with imperfect focus, the camera 163 should record a distinct step 187 as shown in FIG. 13, with the location of the step 187 being indicative of a particular depth of the object's surface at the location under inspection. Because the array 165 is divided into individual pixels, a binary transition between illuminated and non-illuminated regions will only occur if the surface's depth is such that the pattern's edge falls exactly at the boundary between two pixels. In most cases, it will fall somewhere within a pixel, thus causing that pixel to be only partially illuminated. Thus, the step 187 is actually resolvable into a pair of adjacent half-steps. In practice, subsurface scatter degrades resolution so that the step 187 shown in FIG. 13 blurs into a somewhat indistinct step 187 as shown in FIG. 14.

In FIG. 13, the vertical extent of the first half-step of the step 187 depends on where exactly within a pixel the edge 183 actually lands. If the edge has fallen so that most of the pixel is illuminated, the first half-step will be quite high. Otherwise, it will be low.

The first half-step's extent therefore defines an "intermediate value." To the extent this intermediate value can be estimated from the column profile 181 shown in FIG. 10, it provides a way to obtain sub-pixel resolution. In particular, such resolution can be obtained by using a mapping function that maps the closed interval [0, 1] to fractional disparity values. In the simplest case, the mapping function is linear. However, non-linear functions are also possible. An example of a mapping function is:

$$depth = \frac{value - low\_value}{high\_value - low\_value}$$

The illustrated column profile 181 can be viewed as a vector of intensity values $(x_1, x_2, \ldots x_n)$. This vector is referred to herein as the "edge vector" and denoted by "x". The edge profilometer 160 provides this vector to the controller 110. The controller 110 then uses a mapping function D(x), sometimes referred to as a "parametrized transformation," to transform the edge vector x into a measured depth.

Referring back to FIG. 12, the subsurface scattering centers 134 create another problem beyond simply blurring the edge 187 shown in FIG. 11. These scattering centers also 134 corrupt the reflection in a way that alters the actual surface's perceived location. Since the scattering centers 134 are below the surface, the object's surface 132 appears lower than it actually is. Thus, the location of the step 187, even if it were sharper than that shown in FIG. 11, would still be misleading. Moreover, this error cannot easily be compensated for using the regression method discussed in connection with FIG. 11. However, a judicious choice of mapping function D(x) can compensate for this difficulty.

Deriving a mapping function D(x) begins with capturing ground-truth data and providing it to the machine-learning system 112 shown in FIG. 1. This data can be acquired in a variety of ways.

A first way to capture ground-truth data is to use an alternate three-dimensional scanner. Examples include a contact scanner or contact profilometer, a micro-CT scanner, an atomic force microscope, an OCT scanner, and a confocal 3D-scanner. Whichever alternate scanner is chosen should have a resolution no less than that of the edge profilometer 160.

When using an alternate scanner, it is particularly useful to spatially register the data obtained from the alternate scanner to that obtained by the edge profilometer 160. Registration in the transverse directions is easily accomplished using fiducial markers or, equivalently, by registering features in the surface 132. However, because of subsurface scatter, registration in the vertical direction is more difficult. This is because alternative scanners do not experience subsurface scattering in the same way. For example, an atomic force microscope does not experience subsurface scattering at all.

A suitable method for addressing the problem posed by vertical registration is to use a test object that mimics the actual object's form but suppresses subsurface scattering. A suitable test object would be a metal plate.

By using a metal plate, it is possible to compensate for subsurface scattering by comparing the depth data from the edge profilometer 160 in the region with no subsurface scattering to the depth data from the external high-resolution scanner.

Figure 15:
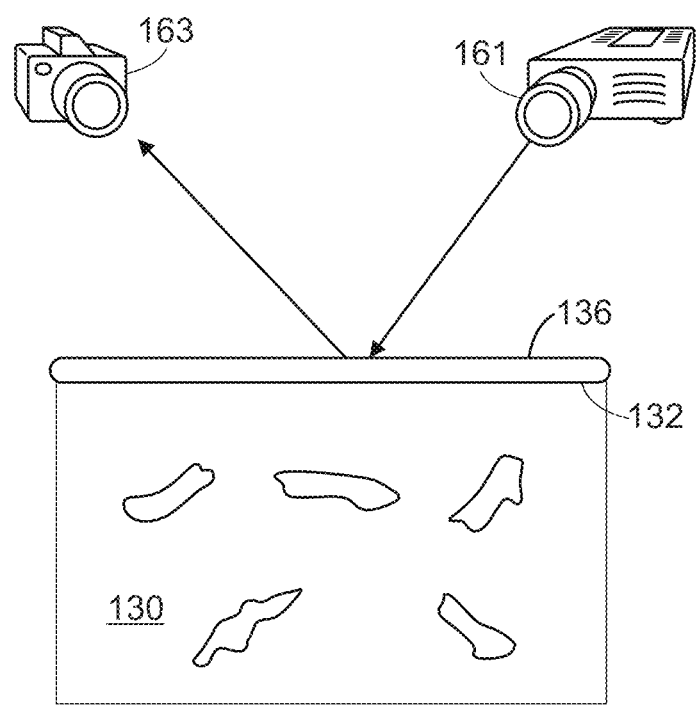
FIG. 15 shows the object in FIG. 14 but coated with a metal layer.

Another method of obtaining ground-truth data avoids using an alternate scanner altogether. This method includes printing the object 130 and capturing corresponding scan data using the still-uncoated object 130, as shown in FIG. 12. The method proceeds with applying a metal coating 136 to the object 130, as shown in FIG. 15. Such a coating prevents light from penetrating the surface 132. A coating as thin as two microns or less is sufficient. Such a coating can be applied using chemical vapor deposition or sputtering.

An optional further step is that of coating the object 130 with a thin layer of a fluorescent material. Examples of a suitable material include an optical brightener that fluoresces in response to incident light and does so in the visible range so that the resulting fluorescence can be captured by the camera. Alternatively, the coating can be a highly-scattering material to provide a stronger signal to the camera 163.

The foregoing methods are particularly useful for obtaining calibration data that can be used in the kit 123, and in particular, in the materials database 129 as part of the resin data 128. In such cases, the procedure would include making a measurement using a slab of the bulk material, coating the slab with a metal coating 136 or a fluorescent layer, and making another measurement. The difference between the two measurements is indicative of the extent of subsurface scattering.

Figure 16:
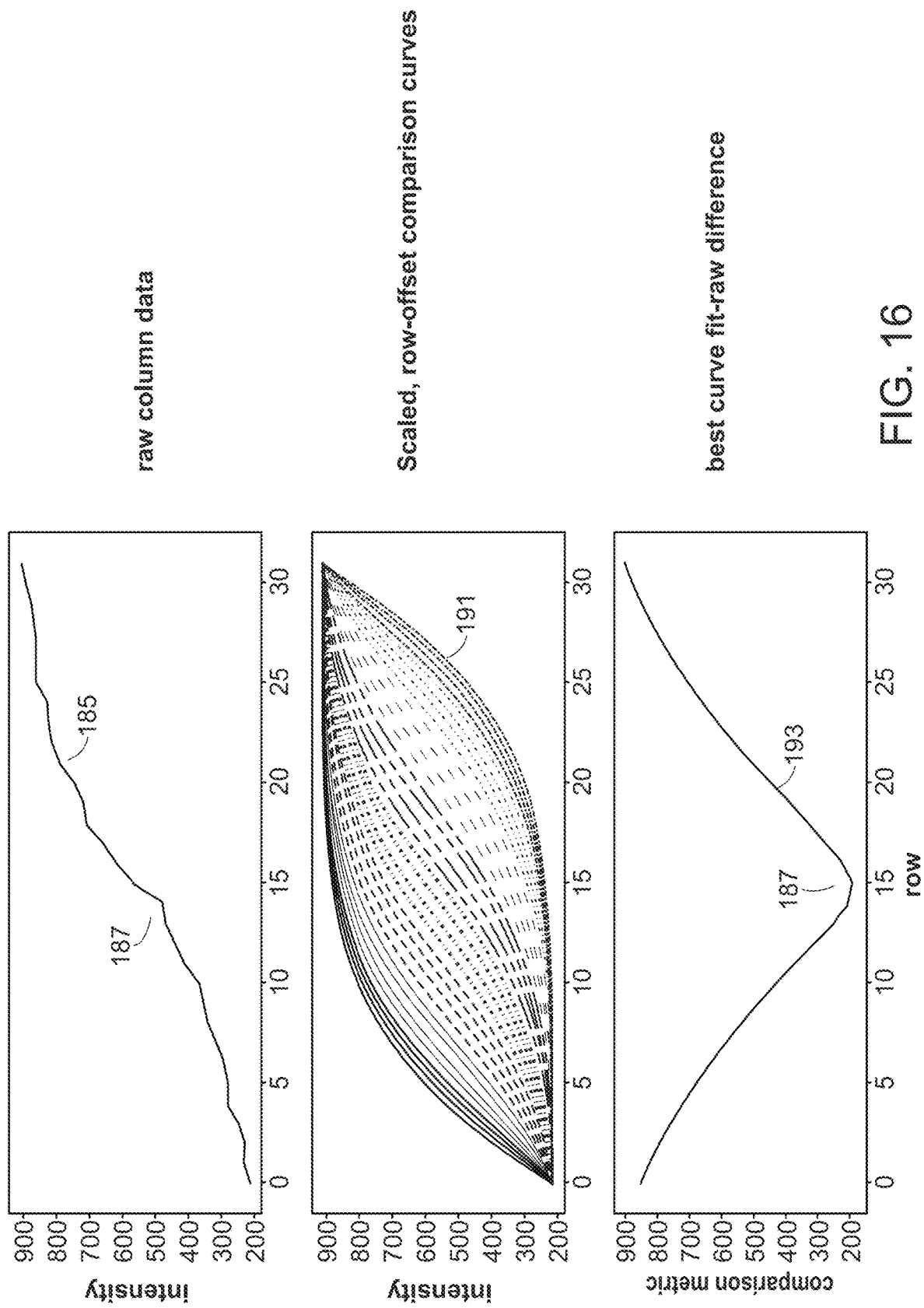
FIG. 16 shows an edge profile and a family of curves for convolution with the edge profile to identify a measured depth.

In either case, the method continues with scanning the now-coated object 130, using the same scanning setup. For each surface point, corresponding row profiles 185 such as those shown in FIGS. 15 and 16 are generated. Ground-truth data can then be obtained by correlating matching row profiles 185.

Another difficulty that arises is inhomogeneous subsurface scattering. One way this occurs is in the case of an object 130 that is made of different materials in different regions. Another way this can arise is by coupling of light to structures outside of the object 130. For example, there may be relatively thin parts of the object 130 that rest on the build platform. When scanning these regions, it is quite possible for light to pass all the way through the object 130 and reflect off the build platform itself. As a result, the optical properties of the build platform come into play. It is therefore particularly useful for the mapping function D(x) to work reliably by providing reliable depth estimates for measurements made under such conditions.

One way to solve this problem is to devise a universal mapping function D(x) that correctly computes the depth value for different types of row profiles 185 corresponding to different material types or different spatial distributions of materials.

Another way to solve this problem is to carry out an equalization procedure. This can be done by adjusting the additives in different materials such that their row profiles 185 are as similar as possible. This can include adjusting the types of additives and the concentrations of those additives. Since all parts of the structure would have roughly the same subsurface scattering properties, this would allow the same mapping function to be used regardless of the material from which the area under measurement was made.

Alternatively, one can avoid the use of additives altogether by determining multiple types of mapping functions $D_i(x)$ and choosing the correct mapping function based on which portion of the object is being inspected. For example, in an object that is made of a build material and a support material, there would be two mapping functions: $D_{BUILD}(x)$ and $D_{SUPPORT}(x)$. The controller 110 would then select the correct mapping function based on what is being scanned. This choice could be made based on advance knowledge of the object and knowledge of the regions to be scanned. It could also be made based on spectroscopic data that is collected in real time during the scanning process itself.

One way to convert a row profile 185 into actual depth data is to fit a logistic curve 189 and to then identify its midpoint. While this method is effective, the computationally intensive nature of curve fitting can tax the controller's real-time processing ability. Additionally, this method imposes the additional step of having to convert the results based on calibrated data.

In an alternative method, illustrated in FIG. 16, the controller 110 convolves a row profile 185 with each curve in a family of pre-computed unit curves 191. Each such pre-computed unit curve 191 corresponds to an expected shape of the row profile 185 for a particular offset, each of which corresponds to a particular depth. The resulting family of pre-computed unit curves 191 thus results in a corresponding set of corresponding offsets.

Preferably, each unit curve 191 has also been scaled to the maximum and minimum values of the row profile 185. By convolving each unit curve 191 with a row profile, it becomes possible to identify the unit curve that most closely matches the row profile 185. Based on the resulting set of convolutions, it becomes possible to identify a best estimate 193 of the step's location and the corresponding depth value.

A method that relies on convolution with a family of pre-computed unit curves 191 is advantageous because the computational steps for carrying out convolution are simpler and more rapidly carried out than those for carrying out curve fitting. Another advantage that arises is the ease with which it becomes possible to accommodate different materials and different thicknesses. When using the foregoing convolution method, it is only necessary to adjust the choice of unit curves 191.

Since each resin has different properties, it is useful to provide different families of pre-computed unit curves 191. These can be stored in the resin data 128. When a new resin module 126 is made available for the printer's use, the controller 110 uses information in the pointer 127 to identify the portion of the resin data 128 that has the correct unit curves for the resin in that resin module 126.

A suitable method for deriving the mapping function D(x) is to carry out machine learning based on collected edge profiles x and collected disparity vectors y. A machine-learning process would use these vectors to identify a mapping function D that satisfies the property: y=D(x). Depending on the choices of edge profiles x and disparity vectors y, the learned mapping-function could be one that works for a single virtual material, which was made by suitably doping different materials with additives so as to equalize their optical properties. Or the learned mapping-function could be one that works for a particular material, in which case the correct mapping function would have to be selected based on the region being scanned, or it could be one that accommodates variations that result from interaction of the material with adjacent structures, for example the build platform.

A number of different models can be used to model the mapping from an edge profile x to a disparity vector y. Examples of such models include support-vector regression, linear regression, and polynomial regression. Neural networks can also be used. These include single layer networks or multiple layer networks. Additionally, it is possible to use regression trees as well as various random forest methods.

To carry out machine learning using the neural network 114 shown in FIG. 1, one acquires a global data in which each edge profile x is paired with a corresponding disparity vector y: $\{(x_1, y_1), \ldots, (x_m, y_m)\}$. This global data is then divided into training data and validation data.

The neural network 114 uses the training data to successively refine estimates of weights between its nodes. It does so by using a suitable optimization algorithm. An example of such an algorithm is a stochastic gradient descent based on training data.

Having obtained suitable weights, the neural network 114 estimates the resulting model's predictive capacity using the validation data and also provides an estimate of uncertainty in its prediction of depth values.

To promote more efficient computation, it is useful to truncate the edge profile x to include only the edge's immediate neighborhood. The bounds of this neighborhood can easily be estimated using simple thresholding to obtain its approximate end points.

Information from a spatial neighborhood can improve depth estimation. One way to do this is to carry out post-processing steps, such as using a noise-reduction filter to filter the depth data to remove noise from a small spatial neighborhood. A suitable filter is a smoothing filter. Another way is to learn an estimating function based on a vector that has been derived from a small spatial neighborhood of the edge.

What is claimed is:

1. An apparatus for additive manufacturing of an object having a surface, said apparatus comprising
   a printhead that is disposed at a variable distance from said surface,
   a profilometer comprising an array of photosensitive elements, said profilometer being configured to detect patterns on said surface, said patterns including a first pattern,
   a controller that controls said variable distance,
   wherein said controller uses information in said first pattern to control said variable distance so as to cause said profilometer to receive a second pattern,
   wherein, in said first pattern, said photosensitive elements are all either entirely illuminated or entirely non-illuminated, and
   wherein, in said second pattern, some of said photosensitive elements are illuminated and others are not illuminated.

2. The apparatus of claim 1, wherein said profilometer comprises an emitter that directs light towards said object, thereby causing a first region of said object to be illuminated by light and a second region of said object to remain in darkness, wherein an edge defines a boundary between said first region and said second region, and wherein changing said variable distance causes said edge to move along said object.

3. The apparatus of claim 1, wherein said profilometer comprises an emitter that directs light towards said object, thereby forming an edge between an illuminated region on said object and a non-illuminated region on said object, wherein, in said second pattern, said edge is disposed on said array, thereby causing some of said photosensitive elements to be illuminated and others to not be illuminated.

4. The apparatus of claim 1, wherein said profilometer comprises an emitter that directs light towards said object, thereby forming an illuminated region on said object and a non-illuminated region on said object, wherein, in said first pattern, said array is entirely in said illuminated region.

5. The apparatus of claim 1, wherein said profilometer comprises an emitter that directs light towards said object, thereby forming an illuminated region on said object and a non-illuminated region on said object, wherein, in said first pattern, said array is entirely in said non-illuminated region.

6. The apparatus of claim 1, wherein said profilometer comprises an emitter that illuminates said object from directly above said object.

7. The apparatus of claim 1, wherein said profilometer comprises an emitter that projects onto said object from a direction that makes a non-zero angle relative to a line that is normal to said surface.

8. The apparatus of claim 1, wherein said array is disposed directly above said object.

9. The apparatus of claim 1, wherein said array is disposed to receive light from said object in an off-axis direction.

10. The apparatus of claim 1, wherein said emitter is disposed such that measurement of said variable distance is independent of a location on said surface, of a region that is being inspected by said profilometer.

11. The apparatus of claim 1, wherein said emitter is disposed such that measurement of said variable distance depends on a location on said surface, of a region that is being inspected by said profilometer.

12. The apparatus of claim 1, wherein said controller is configured to receive a feedback signal indicative of movement of an edge in said second pattern across said array of photosensitive elements.

13. The apparatus of claim 1, wherein said array of photosensitive elements comprises rows of photosensitive elements, wherein at least one of said rows has been rendered inactive, thereby causing said profilometer to be incapable of measuring distances that would be measurable had said rows remained active.

14. The apparatus of claim 1, wherein said controller is configured to control said variable distance by causing said printhead to move in a first direction when said photosensitive elements are all illuminated and to move in a second direction when none of said photosensitive elements are illuminated, said second direction being opposite said first direction.

15. The apparatus of claim 1, wherein in said second pattern, said photosensitive elements that are illuminated are disposed so as to detect an edge that separates those photosensitive elements that are illuminated from those that are not illuminated.

16. The apparatus of claim 1, wherein said profilometer is an edge profilometer.

17. The apparatus of claim 1, wherein said array is a first array and said profilometer comprises a second array of photosensitive elements, wherein, in said first pattern, said photosensitive elements in said second array are all either entirely illuminated or entirely non-illuminated, and wherein, in said second pattern, some of said photosensitive elements in said second array are illuminated and others are not illuminated.

18. The apparatus of claim 1, wherein said profilometer further comprises first and second emitters that illuminate said object from corresponding first and second directions.

19. The apparatus of claim 1, wherein, in said second pattern, said photosensitive elements that are illuminated are illuminated to differing extents.

20. A method of using additive manufacturing to manufacture an object having a surface, wherein said method comprises using a profilometer that comprises an array of photosensitive elements, observing a first pattern on a surface of an object, using information in said first pattern to control a distance between a printhead and said surface so as to receive a second pattern, and using said printhead to deposit additional material on said surface, wherein, in said first pattern, said photosensitive elements are all either entirely illuminated or entirely non-illuminated and wherein, in said second pattern, some of said photosensitive elements are illuminated and others are not illuminated.

21. The apparatus of claim 1, wherein said profilometer comprises an emitter, said emitter comprising an LED pattern projector that directs light towards said object, thereby causing a first region of said object to be illuminated by light and a second region of said object to remain in darkness.

22. The apparatus of claim 1, wherein said profilometer comprises an emitter, said emitter comprising a pattern projector that directs light towards said object, thereby forming an edge between an illuminated region on said object and a non-illuminated region on said object.

23. The apparatus of claim 22, wherein said pattern projector comprises an LED pattern projector.

* * * * *